UNITED STATES PATENT OFFICE.

HEINRICH PRECHT, OF NEUSTASSFURT, GERMANY.

PROCESS OF MAKING ACETYLENE CHLORID.

No. 817,188.         Specification of Letters Patent.         Patented April 10, 1906.

Application filed May 22, 1905. Serial No. 261,663.

*To all whom it may concern:*

Be it known that I, HEINRICH PRECHT, a subject of the King of Prussia, German Emperor, residing at No. 7 Neustassfurt, Germany, have invented certain new and useful Improvements in Processes of Making Acetylene Chlorid; and I do hereby declare the following to be a full, clear, and exact description of the invention, such as will enable others skilled in the art to which it appertains to make and use the same.

While acetylene combines directly with bromin without difficulty, chlorin, on the other hand, owing to its greater affinity for hydrogen acts so strongly on acetylene that a violent explosion takes place, simultaneously liberating free carbon with the formation of hydrochloric acid. Hence in order to chlorinate acetylene without danger the employment of an agent for transmitting the chlorin becomes necessary, and for this purpose penta chlorid of antimony has been especially made use of. The recovery of this substance from the products of reaction is, however, not possible without loss, which in view of the high price of this compound is likely to preclude the utilization of the reaction. This drawback also applies to a proposed mixture of ethylene chlorid and aluminium chlorid, into which mixture chlorin and acetylene are to be simultaneously introduced. This mixture further has the disadvantage that the higher chlorination taking place at a higher temperature—about 120° centigrade—is only possible in an autoclave, as the ethylene chlorid boils at 84° centigrade. The two gases would therefore have to be introduced into the mixture by means of considerable pressure, which, however, would be dangerous, since acetylene, if compressed to two or more atmospheres, acts like an explosive. Besides when introducing chlorin and acetylene simultaneously great difficulties are encountered, these gases acting on one another so rapidly as to cause explosions. I have found that all these drawbacks are avoided by using chlorid of sulfur with an addition of a contact substance, as finely-divided iron, compounds of iron, or the like. Chlorid of sulfur without such ingredients fails to act. Chlorid of sulfur having a high boiling-point, (138° centigrade,) even hexachlorid of ethane may be produced, depending upon the temperature at which chlorination is effected. In consequence of the low price of chlorid of sulfur and in view of the fact that it can be fully recovered it offers many advantages as compared with other substances.

In carrying out my invention acetylene is introduced into a mixture of chlorid of sulfur and powdered or finely-divided iron. The temperature is reduced by cooling if ethane tetrachlorid is to be produced. If, for example, ethane hexachlorid is to be obtained, the mixture is heated. Should acetylene be incompletely or imperfectly absorbed, a strong flow of chlorin to nearly saturation is introduced. The introduction of acetylene and chlorin is repeated a number of times alternately in such a way that chlorin and acetylene cannot act directly on one another.

In order to produce ethane tetrachlorid, the reaction mixture is preferably saturated finally with acetylene, the tetrachlorid formed, boiling at 147° centigrade, is distilled off either by itself or driven off by steam, while the sulfur which remains is converted in the known manner into chlorid of sulfur for reuse in the process.

The reactions taking place may be explained by the following: When chlorin reacts on the mon-chlorid of sulfur, higher chlorids are formed:

$$S_2Cl_2 + 2Cl = 2SCl_2$$

$$S_2Cl_2 + 6Cl = 2SCl_4$$

Now when acetylene reacts upon a mixture of these chlorids—*i. e.*, $S_2Cl_2$, $SCl_2$, and $SCl_4$, as described—tetrachlorethane is produced with the separation of sulfur:

$$2S_2Cl_2 + C_2H_2 = C_2H_2Cl_4 + 4S$$

$$2SCl_2 + C_2H_2 = C_2H_2Cl_4 + 2S$$

$$SCl_4 + C_2H_2 = C_2H_2Cl_4 + S$$

The separated sulfur is again converted, by means of chlorin, into monochlorid:

$$2S + Cl_2 = S_2Cl_2$$

and by the first reaction into higher chlorids again.

It cannot be stated which of the described reactions operate most advantageously to produce the tetrachlorethane. It appears that all of the reactions take place at the same time.

For the purpose of producing, for example, ethane hexachlorid, chlorid of sulfur is preferably saturated finally with chlorin at boiling temperature. When cooling, hexachlorid crystallizes out of the liquid thus obtained, which crystals are further purified by pressing out and subliming or distilling with steam or recrystalizing from a suitable solvent—for example, alcohol. The liquid pressed out consists in general of chlorid of sulfur and dissolved ethane hexachlorid (which could also be separated by fractionation) is after addition of iron powder again treated with acetylene and chlorin. Of course the reaction mixture can be saturated finally with acetylene, whereupon the ethane hexachlorid (boiling-point 185° centigrade) is separated from the sulfur (boiling-point 448°) by distillation, driving it off with steam or by extraction.

Having thus described my invention, what I claim as new therein, and desire to secure by Letters Patent, is—

1. The process of chlorinating acetylene, which consists in reacting upon a mixture of chlorid of sulfur and a contact substance with acetylene, substantially as described.

2. The process of chlorinating acetylene, which consists in reacting upon a mixture of chlorid of sulfur and finely-divided iron, with acetylene, substantially as described.

3. The process of chlorinating acetylene, which consists in reacting upon a mixture of chlorid of sulfur and a contact substance with acetylene at a temperature sufficient to produce the chlorid required, substantially as described.

4. The process of chlorinating acetylene, which consists in reacting upon a mixture of chlorid of sulfur and a contact substance alternately with acetylene and chlorin, substantially as described.

In testimony that I claim the foregoing as my invention I have signed my name in presence of two subscribing witnesses.

HEINRICH PRECHT.

Witnesses:
ADOLF SCHLOSS,
JAMES L. A. BURRELL.